(12) United States Patent
Matsuki et al.

(10) Patent No.: US 7,485,280 B2
(45) Date of Patent: Feb. 3, 2009

(54) CARBON BLACK

(75) Inventors: Akihiro Matsuki, Yokkaichi (JP);
Shinichi Kanamaru, Sakaide (JP);
Yutaka Fukuyama, Tokyo (JP);
Nobutake Mise, Tokyo (JP); Eihachi Takamura, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 31 days.

(21) Appl. No.: 11/346,437

(22) Filed: Feb. 3, 2006

(65) Prior Publication Data
US 2006/0186383 A1      Aug. 24, 2006

Related U.S. Application Data

(63) Continuation of application No. PCT/JP2004/011510, filed on Aug. 4, 2004.

(30) Foreign Application Priority Data

Aug. 5, 2003    (JP)    ............... 2003-286905
Jul. 13, 2004    (JP)    ............... 2004-206165

(51) Int. Cl.
    C09C 1/48    (2006.01)
(52) U.S. Cl. .................. 423/449.1; 423/450
(58) Field of Classification Search ............. 423/449.1, 423/450
    See application file for complete search history.

(56) References Cited

U.S. PATENT DOCUMENTS

| | | | | |
|---|---|---|---|---|
| 4,351,815 A * | 9/1982 | Glasstetter et al. | ...... | 423/445 R |
| 5,352,289 A * | 10/1994 | Weaver et al. | ............. | 106/476 |
| 5,393,821 A | 2/1995 | Shieh et al. | | |
| 6,197,870 B1 * | 3/2001 | Sakakibara | ............. | 524/496 |
| 6,251,983 B1 * | 6/2001 | Vogler et al. | ............. | 524/496 |

FOREIGN PATENT DOCUMENTS

| | | | |
|---|---|---|---|
| CA | 2226277 | | 1/1998 |
| JP | 3-68666 | | 3/1991 |
| JP | 6-187989 | * | 6/1994 |
| JP | 6-187989 | | 7/1994 |
| JP | 8-507555 | | 8/1996 |
| JP | 9-48932 | | 2/1997 |
| JP | 11-513051 | | 11/1999 |
| JP | 2002-121422 | | 4/2002 |

OTHER PUBLICATIONS

Carbon Black Handbook, 3rd Ed., Apr. 1995, (Published by Carbon Black Kyokai) pp. 61-65, 130-132, 328-329, and 550-557.
Pigments, vol. 39, No. 2, p. 36, 1995.

* cited by examiner

*Primary Examiner*—Stuart L. Hendrickson
*Assistant Examiner*—Daniel C. McCracken
(74) *Attorney, Agent, or Firm*—Oblon, Spivak, McClelland, Maier & Neustadt, P.C.

(57) ABSTRACT

To provide carbon black which improves the electrical conductivity and flowability of a resin composition.

Carbon black characterized by having the following characteristics:
  24M4DBP absorption: At least 130 $cm^3/100$ g
  (1,500° C.×30 min) dehydrogenation amount: At most 1.2 mg/g
  Crystallite size Lc: From 10 to 17 Å

More preferably, it has the following characteristics:
  Nitrogen adsorption specific surface area: from 150 to 300 $m^2/g$
  Average particle diameter: from 14 to 24 nm
  CTAB adsorption specific surface area: from 120 to 220 $m^2/g$
  DBP absorption: from 150 to 400 $cm^3/100$ g
  Oxygen-containing functional group density: at most 3 $\mu mol/m^2$.

8 Claims, 5 Drawing Sheets

Fig.3 (continued)

—●— Resin composition No.1
—◆— Resin composition No.2
—▲— Resin composition No.3
—■— Resin composition No.4
—✱— Resin composition No.Co1
—✕— Resin composition No.Co2
—+— Resin composition No.Co3
··○·· Resin composition No.Co4
··✕·· Resin composition No.Co5
··△·· Resin composition No.Co6
··▢·· Resin composition No.Co7
··▲·· Resin composition No.Co8
··+·· Resin composition No.Co9
—✱— Resin composition No.Co10
—■— Resin composition No.Co11

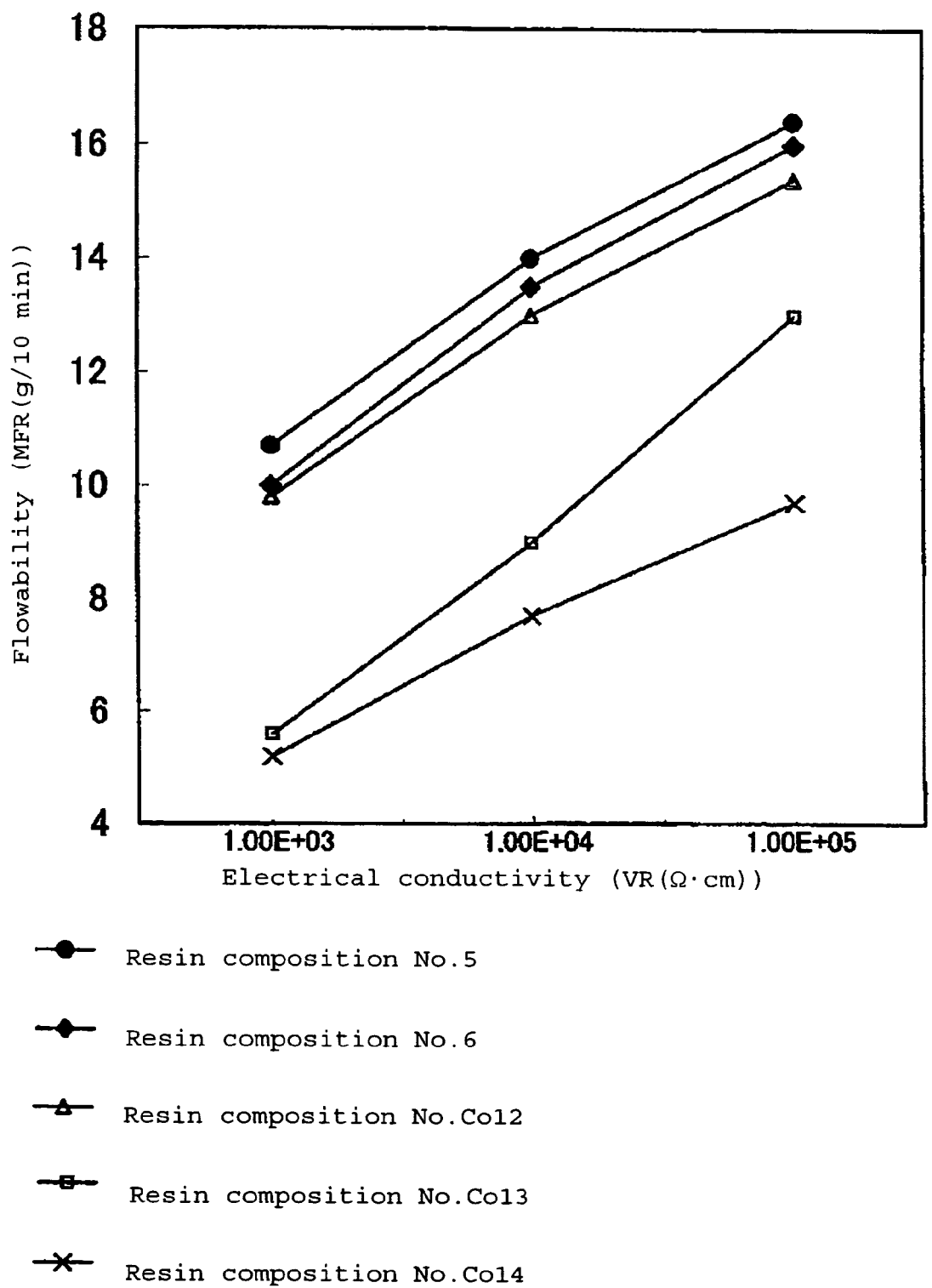

CARBON BLACK

CROSS REFERENCES TO RELATED APPLICATIONS

This application is a continuation of International Patent Application No. PCT/JP04/11510, filed on Aug. 4, 2004, and claim priority to Japanese Patent Application No. 2003-286905, filed on Aug. 5, 2003, and Japanese Patent Application No. 2004-206165, filed on Jul. 13, 2004.

TECHNICAL FIELD

The present invention relates to carbon black which is suitable for being incorporated to an electrically conductive resin composition, particularly to carbon black which is suitable for oil furnace carbon black to be produced by an oil furnace method.

BACKGROUND ART

An apparatus for producing carbon black by an oil furnace method has a first reaction zone wherein a fuel is burned to form a high temperature combustion gas stream, a second reaction zone provided next to the first reaction zone, wherein a carbon black raw material hydrocarbon (hereinafter sometimes referred to as an oil) is introduced to carry out a carbon black-forming reaction, and a third reaction zone provided next to the second reaction zone and having a cooling means to stop the carbon-forming reaction.

To produce carbon black by this carbon black reaction apparatus, a high temperature combustion gas stream is formed in the first reaction zone, and a carbon black raw material hydrocarbon (an oil) is sprayed in the second reaction zone to form carbon black in the second reaction zone. A gas stream containing this carbon black is introduced into the third reaction zone and rapidly cooled by receiving water spray from a spray nozzle in the third reaction zone. A gas stream containing carbon black in the third reaction zone is then via a gas flue introduced into a collection means such as a cyclone or bag filter, whereby carbon black is collected.

With a conductive resin composition having carbon black incorporated to a resin composition, it is preferred to have the structure of carbon black developed in order to improve the electrical conductivity. In carbon black having the structure developed, primary particles of carbon black are linked in a branch-form or botryoidally, whereby the electrical conductivity of the resin composition is improved. Further, the electrical conductivity of a resin composition can be improved also by reducing the primary particle diameter of carbon black. Still further, the electrical conductivity can be improved by reducing the amount of functional groups (an oxygen-containing compound) at the surface of primary particles of carbon black.

Further, a relation between the conditions for the production of oil furnace carbon black and the particle diameter and structure, is disclosed in paragraphs 0004-0008 in JP-A-2002-121422. Further, in FIG. 2 in the same publication, the production limit for furnace black is disclosed by the nitrogen adsorption specific surface area ($N_2SA$) and the 24M4DBP absorption.

And, with respect to the hydrogen amount and the volume resistivity of carbon black itself, it is disclosed that the resistivity of carbon black itself decreases if the hydrogen amount decreases, as shown in FIG. 1.7 and pages 552 to 555 in "Carbon Black Handbook", third edition (published by Carbon Black Association on Apr. 15, 1995). Further, "Ganryo" (Pigments) vol. 39, No. 2, p. 36, FIG. 22 discloses a relation between the hydrogen content and the volume resistivity with respect to rubber (SBR type).

JP-A-08-507555 discloses carbon black having a CTAB adsorption specific surface area of from 140 to 250 $m^2/g$, a CDBP absorption of from 120 to 150 $cm^3/100$ g, a nitrogen adsorption specific surface area of from 150 to 180 $m^2/g$, a Stokes mode diameter ($D_{mod}$) of from 40 to 67 nm and a Stokes mode half value width ($D_{1/2}$) of at most 47 nm, as carbon black to be incorporated to a rubber composition for an application to tires. This carbon black is not carbon black to be incorporated to a conductive resin composition, and there is no description at all with respect to the structure of carbon black, and the electrical conductivity and flowability of a conductive resin composition.

Not only with carbon black disclosed in this JP-A-08-507555, but also with carbon black to be incorporated to rubber in general, the dehydrogenation amount at (1,500° C.×30 min) is made to be large to some extent in order to secure the affinity to the matrix rubber, and with such carbon black having a large dehydrogenation amount at (1,500° C.×30 min), it is not possible to obtain good electrical conductivity.

DISCLOSURE OF THE INVENTION

In order to impart electrical conductivity to a resin like this, carbon black is mixed in a large amount. However, with a resin composition having conventional carbon black incorporated as a conductive filler, the electrical conductivity is inadequate, and the flowability is low, whereby there has been, for example, a molding failure as the resin does not flow to a corner of an injection molding mold or a problem such that when it is used as a conductive coating material, a smooth coating film cannot be obtained as the viscosity at the time of coating is high. Therefore, a conductive filler (carbon black) capable of improving the flowability of the resin more than ever while maintaining high electrical conductivity, has been desired.

It is an object of the present invention to provide carbon black which is capable of improving the electrical conductivity and flowability of a conductive composition.

The carbon black of the present invention is characterized by having the following characteristics:

24M4DBP absorption: At least 130 $cm^3/100$ g (1,500° C.×30 min) dehydrogenation amount: At most 1.2 mg/g Crystallite size Lc: From 10 to 17 Å

In addition to the above characteristics, the carbon black of the present invention preferably further has the following characteristics:

The nitrogen adsorption specific surface area is from 150 to 300 $m^2/g$.

The ratio of the Stokes mode diameter ($D_{mod}$) to the 24M4DBP absorption ($D_{mod}$/24M4DBP) is from 0.6 to 0.9.

The average particle diameter as measured by a transmission electron microscope is from 14 to 24 nm.

The CTAB (cetyltrimethylammonium bromide) adsorption specific surface area is from 120 to 220 $m^2/g$.

The DBP absorption is from 150 to 400 $cm^3/100$ g.

The oxygen-containing functional group density as defined by the following formula, is at most 3 µmol/m²:

Oxygen-containing functional group density (µmol/m²)=[(1,500° C.×30 min) CO generation (µmol/g)+(1,500° C.×30 min) CO₂ generation (µmol/g)]/nitrogen adsorption specific surface area (m²/g).

The definitions of the 24M4DBP absorption and the DBP absorption, the (1,500° C.×30 min) dehydrogenation amount, the crystallite size Lc, the nitrogen adsorption specific surface area, the Stokes mode diameter ($D_{mod}$) and the Stokes mode half value width ($D_{1/2}$), the average particle diameter, the CTAB adsorption specific surface area, and the oxygen-containing functional group density, in the present invention, are as follows.

24M4DBP Absorption and DBP Absorption

The 24M4DBP absorption and the DBP absorption are in accordance with JIS K6217 (unit: cm³/100 g).

(1,500° C.×30 min) Dehydrogenation Amount

The (1,500° C.×30 min) dehydrogenation amount (hereinafter referred to simply as "dehydrogenation amount") is the amount of hydrogen in a gas generated when carbon black is heated in vacuum at 1,500° C. for 30 minutes, and specifically, it is measured as follows.

Measuring Method

About 0.5 g of carbon black is accurately weighed and put into an alumina tube. After evacuating to 0.01 Torr (1.3 Pa), the evacuated system is closed and maintained in an electric furnace at 1,500° C. for 30 minutes to decompose and volatilize an oxygen compound or a hydrogen compound present in the carbon black. The volatilized component is, through a metering suction pump, collected into a gas collection tube having a predetermined capacity. From the pressure and the temperature, the amount of gas is obtained, and the composition is analyzed by gas chromatograph, and the amount (mg) of hydrogen ($H_2$) generated is obtained, whereupon a value corresponding to the amount of hydrogen generated per 1 g of carbon black, is calculated (unit: mg/g)

Crystallite Size Lc

Measured by using a X-ray diffraction apparatus (RINT-1500 model, manufactured by Rigaku Denki K.K.). The measuring conditions were such that Cu was used for the X-ray tube; the tube voltage was 40 KV; and the tube current was 250 mA. A carbon black sample was packed on a sample plate attached to the apparatus, and the measuring angle (2θ) was from 10° to 60°, and the measuring speed was 0.5°/min. The peak position and the half value width were calculated by a software of the apparatus. Further, for correction of the measuring angle, silicon for X-ray standard was used. Using the results thus obtained, Lc was obtained by the Scherrer's formula:

$$Lc(Å)=K\times\lambda/\beta\times\cos\theta$$

wherein K is the form factor 0.9, λ is the wavelength of characteristic X-ray CuKα 1.5418 (Å), β is the half value width (radian), and θ is the peak position (degree).

Nitrogen Adsorption Specific Surface Area

The nitrogen adsorption specific surface area ($N_2SA$) is defined in accordance with JIS K6217 (unit: m²/g).

Stokes Mode Diameter ($D_{mod}$) and Stokes Mode Half Value Width ($D_{1/2}$)

The Stokes mode diameter ($D_{mod}$) and the Stokes mode half value width ($D_{1/2}$) are obtained by the following measuring method.

Measuring Method

To a 20 vol % ethanol aqueous solution having three drops of a surfactant ("NONIDET P-40", manufactured by SIGMA CHEMICAL) added, accurately weighted carbon black was added to prepare a sample solution having a carbon black concentration of 0.01 wt %. This sample solution was subjected to dispersing treatment for 20 minutes by means of an ultrasonic cleaning machine (ULTRASONIC STIRRING BATH, manufactured by LACOMANUFACTURING CO.) to obtain a carbon black slurry. On the other hand, into a centrifugal sedimentation type particle size distribution measuring apparatus ("BI-DCP PARTICLSIZER", manufactured by BROOK HAVEN INSTRUMENTS), 10 ml of a spinning liquid (pure water) and further, 1 ml of a buffer solution (a 20 vol % ethanol aqueous solution) were injected. Then, 1 ml of the carbon black slurry prepared as described above, was injected, followed by centrifugal sedimentation at a rotational speed of 10,000 rpm, whereupon a Stokes corresponding diameter is calculated from the absolute specific gravity of 1.78 g/cm³, and as shown in FIG. 2, a histogram of relative frequency of occurrence against the Stokes corresponding diameter, is prepared (provided that with respect to Comparative Examples 9 and 10 given hereinafter, the rotational speed was 4,000 rpm, and the absolute specific gravity was 1.84 g/cm³). From the peak A of the histogram, a linear line B is drawn in parallel with Y-axis, and the intersecting point with X-axis of the histogram is identified as C. The Stokes diameter at C here is the Stokes mode diameter ($D_{mod}$). Further, when the midpoint of the linear line B is designated as F, a linear line G is drawn to pass through F in parallel with X-axis. The linear line G intersects at two points D and E with the distribution curve of the histogram. Here, the absolute value of the difference between the respective Stokes diameters at D and E is the Stokes mode half value width ($D_{1/2}$).

Average Particle Diameter

Obtained by a transmission electron microscope. Specifically, a carbon black sample was dispersed in chloroform for 10 minutes by an ultrasonic disperser at 150 kHz with 0.4 kW to obtain a dispersed sample, which was sprayed to a carbon-reinforced support film to fix it. The sample thus fixed was photographed by a transmission electron microscope, and with respect to an image at magnifications from 50,000 to 200,000 times, the diameters of randomly selected at least 1,000 carbon black particles were measured by means of an Endter apparatus, and the average value was taken as the average particle diameter.

CTAB Adsorption Specific Surface Area

The CTAB adsorption specific surface area is in accordance with JIS K6217 (unit: m²/g).

Oxygen-Containing Functional Group Density

The (1,500° C.×30 min) CO generation (hereinafter referred to simply as "CO generation") and the (1,500° C.×30 min) CO₂ generation (hereinafter referred simply as "$CO_2$ generation") are amounts of CO and $CO_2$, respectively, in a gas generated during heating of carbon black in vacuum at 1,500° C. for 30 minutes, and specifically, they will be measured as follows.

Measuring Method

About 0.5 g of carbon black is accurately weighed and put into an alumina tube, and after evacuating to 0.01 Torr (1.3 Pa), the evacuated system is closed and maintained in an electric furnace at 1,500°C. for 30 minutes to decompose and volatilize an oxygen compound and a hydrogen compound present in the carbon black. The volatilized component is, through a metering suction pump, collected in a gas collecting tube having a predetermined capacity. The amount of gas is obtained by the pressure and temperature, and at the same time, the composition is analyzed by gas chromatograph to obtain the amounts (mg) of carbon monoxide (CO) and carbon dioxide ($CO_2$) generated, and values corresponding to CO and $CO_2$ generated from per 1 g of carbon black are calculated (unit: mg/g).

Further, the amounts of the respective gases generated, thus obtained are converted to μmol/g, and the oxygen-containing functional group density is obtained by the following formula:

Oxygen-containing functional group density (μmol/$m^2$)=[(1,500° C.×30 min) CO generation (μmol/g)+(1,500° C.×30 min) $CO_2$ generation (μmol/g)]/nitrogen adsorption specific surface area ($m^2$/g)

EFFECTS OF THE INVENTION

According to the present invention it is possible to provide carbon black which is capable of improving both the electrical conductivity and the flowability simultaneously when it is incorporated to a resin composition.

Namely, such an invention has been made on the basis of a new finding that with carbon black having a specific 24M4DBP absorption, by reducing the hydrogen content, adjusting the crystallite size to a specific small numerical value range and further preferably setting the diameter of agglomerates of secondary particles within a specific relative level range to the structure level, i.e. not an absolute value, both the electrical conductivity and the flowability of a resin composition having such carbon black incorporated, will be in good balance, and each of them will maintain a good characteristic without deterioration.

As a result of an extensive study by the present inventors, it has been found that when carbon black, particularly carbon black by an oil furnace method, is made so that the vicinity of the surface of primary particles is graphitized and the interior is made amorphous, and such carbon black is mixed as a conductive filler to a resin composition, the resin composition will have good flowability while maintaining high electric conductivity. And, it has been found that for this purpose, by adjusting the amount of hydrogen in carbon to be at most a specific level and maintaining the crystallite size obtained by X-ray diffraction to be within a certain specific range, the above effects can be obtained. Thus, the present invention has been accomplished.

Further, such carbon black can be produced in such a manner that, for example, in a case where carbon black is produced by an oil furnace method, carbon black formed in the production furnace is maintained at a certain specific temperature for a specific retention time so that the vicinity of the surface of primary particles will be graphitized, and the interior is maintained to be amorphous, as mentioned above.

With the resin composition employing the carbon black of the present invention, both the electrical conductivity and the flowability are in good balance, and each of them can maintain the good characteristic without deterioration. The reason for this is not clearly understood but is considered to be attributable to the fact that in the carbon black of the present invention, crystals are developed (graphitized) in the vicinity of the surface of primary particles, and the interior of the primary particles is amorphous.

Namely, carbon black graphitized to the interior shows electrical conductivity slightly only in the perpendicular direction, since electric conductivity in the direction of the graphite crystal face (the horizontal direction) is not provided (since electricity can hardly pass through the carbon black primary particles), the electrical conductivity of carbon black itself tends to be low. Whereas, with the carbon black of the present invention, the interior of the primary particles is amorphous, whereby electrical conductivity in the direction perpendicular to the surface of the crystals is small, and the electrical conductivity of the carbon black itself is secured by the interior of the primary particles (electricity can pass through the carbon black primary particles), whereby it is considered possible to maintain adequate electrical conductivity.

Further, it is considered that the carbon black of the present invention is excellent in slipping contact with the resin, since the surface in contact with the resin is graphitized, whereby when it is incorporated in the resin composition, the flowability of the resin composition will not decrease. Further, it is considered that with the resin composition containing the carbon black of the present invention, the interior of the primary particles of the carbon black is amorphous, whereby the carbon black can easily be deformed in the resin, and carbon black particles scarcely form an agglomerate structure, whereby the flowability of the resin composition will not decrease.

BRIEF DESCRIPTION OF THE DRAWINGS

FIG. 4 is a graph showing the results of Examples and Comparative Examples for high impact polystyrene resin compositions.

SYMBOLS

Figure 1:
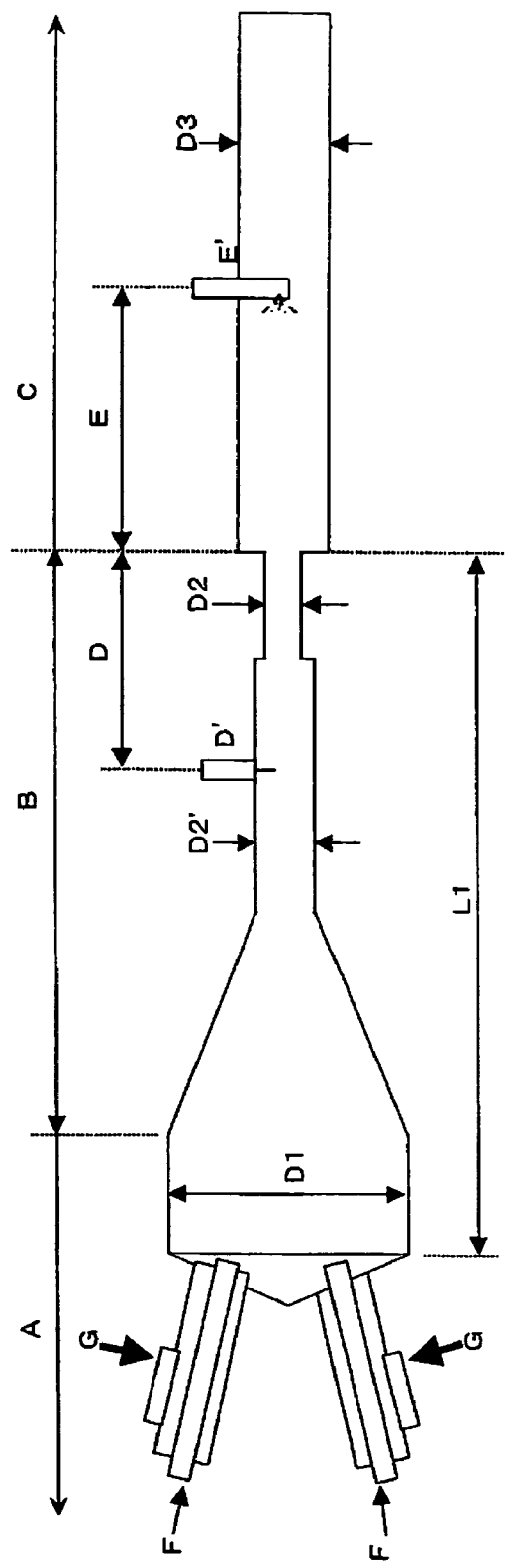
FIG. 1 is a schematic view illustrating the structure of the apparatus for producing carbon black.
Figure 2:
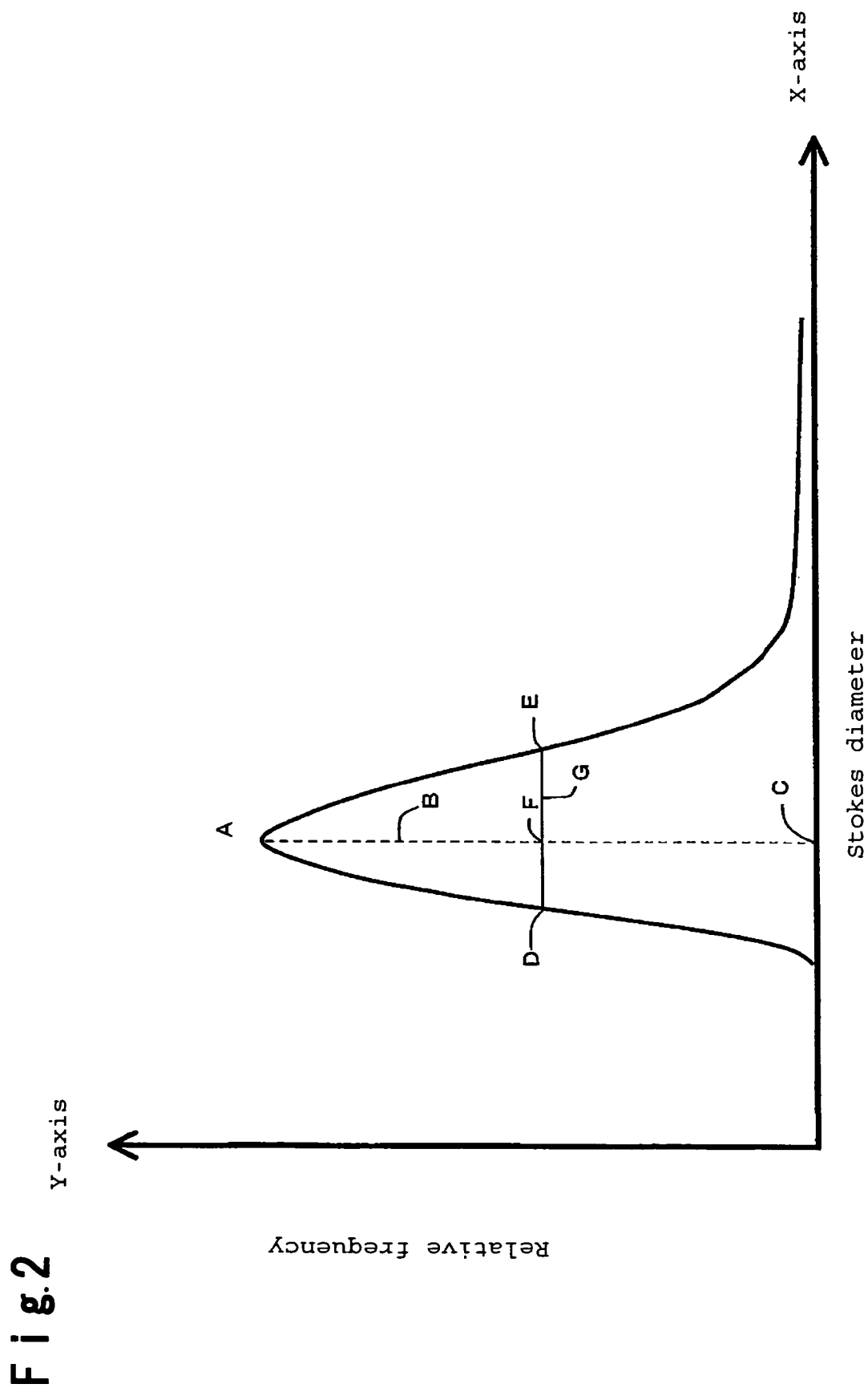
FIG. 2 a graph illustrating a Stokes mode diameter ($D_{mod}$) and the Stokes mode half value width ($D_{1/2}$).

A: First reaction zone
B: Second reaction zone
C: Third reaction zone
D: Length for introduction of carbon black raw material
D': Nozzle for introducing carbon black raw material
E: Length for stopping the reaction
E': Nozzle for supplying cooling water
F: Nozzle for introducing fuel
G: Nozzle for introducing combustion air

BEST MODE FOR CARRYING OUT THE INVENTION

The carbon black of the present invention is as follows:
24M4DBP absorption: at least 130 $cm^3$/100 g
Dehydrogenation amount at 1,500° C. for 30 minutes: at most 1.2 mg/g
Crystallite size Lc: from 10 to 17 Å
Further, the carbon black of the present invention preferably satisfies the following:
The nitrogen adsorption specific surface area: from 150 to 300 $m^2$/g
$D_{mod}$/24M4DBP: from 0.6 to 0.9
The average particle diameter: from 14 to 24 nm
CTAB adsorption specific surface area: from 120 to 220 $m^2$/g
DBP absorption: from 150 to 400 $cm^3$/100 g
Oxygen-containing functional group density: at most 3 μmol/$m^2$ Usually, carbon black is in the form of secondary particles wherein primary particles are botryoidally linked to form a unique chain so-called "structure". DBP (dibutyl phthalate) is absorbed in void spaces in such botryoidal chain. Accordingly, the 24M4DBP absorption or DBP absorption is an important index value which carbon black has.

The carbon black of the present invention has a 24M4DBP absorption of at least 130 cm$^3$/100 g, preferably at least 140 cm$^3$/100 g, more preferably at least 145 cm$^3$/100 g. If the 24M4DBP absorption is less than 130 cm$^3$/100 g, no adequate electrical conductivity will be obtained when such carbon black is formed into a resin composition. However, if the 24M4DBP absorption is too high, the dispersibility in the resin tends to be low, or the load of the furnace tends to be large at the time of the production, such being uneconomical. Accordingly, it is usually at most 260 cm$^3$/100 g, preferably at most 200 cm$^3$/100 g, particularly preferably at most 160 cm$^3$/100 g.

Further, with the carbon black of the present invention, if the DBP absorption is too small, the electrical conductivity may sometimes deteriorate when such carbon black is formed into a resin composition, and if it is inversely too large, the flowability of the resin composition may sometimes deteriorate. Accordingly, the DBP absorption is usually at least 150 cm$^3$/100 g, preferably at least 155 cm$^3$/100 g and usually at most 400 cm$^3$/100 g, preferably at most 250 cm$^3$/100 g, more preferably at most 230 cm$^3$/100 g, particularly preferably at most 210 cm$^3$/100 g.

In the present invention, by adjusting the dehydrogenation amount in the carbon black to be at most 1.2 mg/g, preferably at most 1.0 mg/g, more preferably at most 0.8 mg/g, it becomes possible to increase the electrical conductivity of a resin composition having such carbon black incorporated. In the present invention, the dehydrogenation amount should better be small within the range of at most 1.2 mg/g. However, usually, for such a reason as industrially economical efficiency, it is preferably at least 0.1 mg/g.

If the dehydrogenation amount exceeds 1.2 mg/g, the crystal growth in the vicinity of the surface of carbon black tends to be inadequate, acidic functional groups are likely to attach to the surface, for example, during the granulation/drying step of the carbon black, and when it is formed into a resin composition, the electrical conductivity is likely to be low.

In the present invention, the crystallite size Lc of the carbon black is adjusted to be from 10 to 17 Å, preferably from 11 to 16 Å. By adjusting the crystallite size within this specific range, both the electrical conductivity and the flowability of the resin composition can be increased. If the crystallite size is too large, the electrical conductivity of the resin composition is likely to be low, and if the crystallite size is inversely too small, no adequate electrical conductivity is likely to be obtainable.

Further, in the present invention, the nitrogen adsorption specific surface area of the carbon black is preferably from 150 to 300 m$^2$/g. The larger the nitrogen adsorption specific surface area, the more improved the electrical conductivity of the resin composition. However, if it exceeds 300 m$^2$/g, the dispersibility in the resin tends to be low, or in the case of e.g. a polyolefin, the flowability of the resin composition tends to be poor. The reason is considered to be such that the carbon black adsorbs a plasticizer in the resin. In the present invention, the nitrogen adsorption specific surface area is made to be preferably from 150 to 300 m$^2$/g, more preferably from 200 to 290 m$^2$/g, whereby both the electrical conductivity and the flowability of the resin composition will be better.

Further, in the present invention, preferred is carbon black having the ratio of $D_{mod}$/24M4DBP adjusted to preferably within a range of from 0.6 to 0.9, particularly preferably from 0.6 to 0.8. As mentioned above, the carbon black is composed of secondary particles (agglomerates) having a plurality of primary particles chained to one another, and as an index for the degree of development of such an agglomerate structure, the 24M4DBP absorption is used. Further, as another index to measure a characteristic of carbon, a Stokes diameter is known. As such a Stokes diameter, a diameter (mode diameter: $D_{mod}$) obtained by a centrifugal sedimentation method (DCP) is usually employed on a basis such that the carbon black agglomerates are regarded to be pseudo-spherical which follows the Stokes rule, and as an index for distribution of $D_{mod}$, the half value width ($D_{1/2}$) of $D_{mod}$ is employed.

Heretofore, using these indices, their ratio ($D_{1/2}/D_{mod}$) and other physical values as indices of physical properties of carbon black, improvements of the physical properties, processability, etc. of carbon black itself, rubber or the resin composition, have been made. However, heretofore, these numerical values have been evaluated merely independently, and the characteristics of carbon black have not been sufficiently grasped. For example, solely by the Stokes mode diameter ($D_{mod}$) of carbon black, the development state of its structure cannot unambiguously be determined, and there has been a problem such that no adequate improvement has been made particularly with respect to carbon black to be added to a conductive resin composition such that even with carbon black having the same $D_{mod}$, there is a difference in the electrical conductivity.

Under these circumstances, the present inventors have conducted an extensive study and as a result, have found it possible to realize a conductive resin composition having an excellent balance of electrical conductivity and flowability by using, as a filler for a conductive resin composition, carbon black wherein $D_{mod}$ is within a specific numerical value range to the 24M4DBP absorption showing the degree of development of the structure i.e. carbon black wherein a value of $D_{mod}$/24M4DBP is within specific range.

This numerical value represented by $D_{mod}$/24M4DBP is one showing the size of an agglomerate diameter to the degree of development of the structure of carbon black. The lower the numerical value, i.e. the higher the degree of development of the structure to the agglomerate diameter of the same size, the more densed the primary particles of carbon black. If this numerical value is too low, the flowability of the resin composition is likely to be low due to a decrease in the affinity with the resin, or the electrical conductivity of the resin composition is likely to be low due to a decrease in the dispersibility of the carbon black in the resin composition. On the other hand, if it is too high, the electrical conductivity of carbon black itself tends to be low, and due to an increase of the amount of carbon black added to a conductive resin composition in order to impart the desired electrical conductivity, the mechanical properties, etc. of the resin composition are likely to deteriorate. Accordingly, with the carbon black of the present invention, $D_{mod}$/24M4DBP is preferably at least 0.6 and at most 0.9.

Further, with the carbon black of the present invention, it is preferred that the agglomerate diameter distribution to the degree of development of the structure is narrow. Specifically, it is preferred that the numerical value represented by the ratio ($D_{1/2}$/24M4DBP) of the Stokes mode half value width ($D_{1/2}$) to the 24M4DBP absorption, is small. If this numerical value is too high, the electrical conductivity of carbon black itself tends to be low, and by an increase of the amount of carbon black added to the conductive resin composition in order to impart the desired electrical conductivity, the mechanical properties, etc. of the resin composition are likely to deteriorate. Accordingly, with the carbon black of the present invention, $D_{1/2}/24M4DBP$ is preferably at most 0.9. The lower limit is not particularly limited, but it is preferably at least 0.45 for such a reason as economical efficiency for the production.

Further, the average particle size of the carbon black of the present invention is optional, but it is preferably from 14 to 24 nm, particularly preferably from 15 to 18 nm. If this average particle diameter is too small, the dispersibility in the resin composition tends to be low, and if it is inversely too large, the electrical conductivity of the resin composition is likely to deteriorate.

Further, in the present invention, the CTAB adsorption specific surface area of the carbon black is made to be preferably from 120 to 220 $m^2/g$, particularly preferably 150 to 200 $m^2/g$. By adjusting it within this specific range, both the electrical conductivity and the flowability of the resin composition can be further improved. If the CTAB specific surface area is too small, the electrical conductivity is likely to deteriorate, and if it is inversely too large, the dispersibility in the resin composition is likely to deteriorate.

In addition to the above, in the present invention, it is preferred that the oxygen-containing functional group density defined by the following formula is made to be preferably at most 3 $\mu mol/m^2$.

Oxygen-containing functional group density ($\mu mol/m^2$)=[CO generation ($\mu mol/g$)+$CO_2$ generation ($\mu mol/g$)]/nitrogen adsorption specific surface area ($m^2/g$)

Here, this numerical value will be explained. In the carbon black, surface functional groups are present to some extent, and when they are heated, carbon monoxide (CO) and carbon dioxide ($CO_2$) will be formed. For example, if carbonyl groups (ketone, quinone, etc.) are present, CO is mainly formed by the decomposition, and if carboxyl groups and their derivatives (ester, lactone, etc.) are present, $CO_2$ will likewise be formed. Namely, by obtaining the amounts of gases formed, the amounts of functional groups present on the surface of the carbon black can be estimated. On the other hand, it has heretofore been known that to improve the electrical conductivity of carbon black, the amounts of these functional groups should better be small. However, for these functional groups, it has been common to use numerical values based on the amounts of gases formed per the weight of carbon black. In other words, it has been conventional theory that the amounts of functional groups to the weight of carbon black are influential over the electrical conductivity.

Whereas, as a result of a further extensive study, the present inventors have found that from a concept separate from the dispersibility, also with respect to the electrical conductivity, as the amount of these functional groups, the number per unit surface area rather than the numerical value per the weight of carbon black is effective for the electrical conductivity of the resin composition, or to satisfy both the electrical conductivity and the flowability.

The reason for such an effect is not clearly understood, but it is considered that at the time when the current flows in the resin composition, functional groups localized at the surface of the carbon black will hinder electron movements among the secondary particles of carbon black, and rather than the absolute amount per weight, the number per unit surface area (density) is influential over the electrical conductivity.

Namely, the oxygen-containing functional group density is one showing the number of functional groups per a unit surface area of carbon black, and this numerical value should preferably be low. If this numerical value is high, for such a reason, the electrical conductivity of the resin composition containing such carbon black will decrease. This numerical value should preferably be low from the viewpoint of the electrical conductivity. However, if it is too low, as mentioned above, the dispersibility will decrease, and the electrical conductivity or the flowability may rather deteriorate. Further, like in the case of the dehydrogenation amount, such is disadvantageous for such a reason as industrial economical efficiency. Accordingly, the oxygen-containing functional group density is preferably at least 0.1 $\mu mol/m^2$, particularly preferably at least 1.0 $\mu mol/m^2$.

The method for producing the carbon black of the present invention is optional. For example, an oil furnace method or an acetylene method, or Ketjen black by an activation method, may be mentioned. Among them, an oil furnace method is preferred, since the carbon black can be produced inexpensively and in good yield. Now, as an example of the process for producing the carbon black of the present invention, an oil furnace method will be described.

An example of the apparatus for producing the carbon black of the present invention is shown in FIG. 1. This apparatus is an apparatus for producing carbon black by an oil furnace method, and it comprises a first reaction zone A wherein a fuel is burned to form a high temperature combustion gas stream, a second reaction zone B connected downstream thereof and having an introduction nozzle to introduce carbon black raw material and a third reaction zone C connected downstream thereof and having a nozzle to supply e.g. cooling water into the furnace in order to stop the carbon black-forming reaction.

Firstly, from the fuel introduction nozzle F, a fuel is introduced in the form of a spray, and this fuel is mixed with combustion air from a combustion air introduction nozzle G and burned to obtain a high temperature combustion gas stream. The temperature of the combustion gas stream is at a level of from 1,300° C. to 2,000° C. The fuel to be used for the formation of the high temperature combustion gas is optional, and for example, a liquid fuel such as heavy oil, light oil, gasoline or kerosene, or a gas fuel such as natural gas, propane or hydrogen, may be mentioned. The generated high temperature combustion gas stream will pass through a gradually converged production furnace, whereby the gas flow rate will increase, and the turbulence energy in the furnace will be improved.

The carbon black raw material to be introduced to the second reaction zone B may, for example, be a coal type hydrocarbon such as creosote oil, a petroleum type hydrocarbon such as ethylene bottom oil. By adjusting the position for introducing the carbon black raw material or the amount of the raw material, it is possible to adjust the particle diameter (the primary particle diameter) or the structure of the carbon black.

The carbon black formed in the second reaction zone B is quenched by contact with e.g. cooling water in the third reaction zone C, whereby the carbon black formation reaction will be terminated. Thereafter, the gas and the carbon black are separated usually by a collection apparatus such as a bag filter or cyclone, to obtain the carbon black. Further, the obtained carbon black is processed by e.g. a pin type wet system granulation machine using e.g. water as a granulation medium to form grains of about 1 mm, and then usually subjected to a step of drying by a rotary dryer.

In order to produce the carbon black of the present invention i.e. carbon black having a 24M4DBP absorption of at least 130 $cm^3/100$ g, a dehydrogenation amount of at most 1.2 mg/g and a crystallite size Lc of from 10 to 17 Å, the retention time of carbon black in the furnace is adjusted to be within a specific range by adjusting the position of carbon black raw material introduction nozzle D' in the second reaction zone B and the position of the cooling water supply nozzle E' in the third reaction zone C, whereby as mentioned above, the 24M4DBP absorption and the specific surface area of carbon black be made to have values within the specific ranges, Lc be made to have a specific small value without being made to be excessively large, and dehydrogenation at the surface of the carbon black particles be made in an advanced state. Specifically, the temperature in the furnace is adjusted to be from 1,500° C. to 2,000° C., preferably from 1,600° C. to 1,800° C., and the retention time in the furnace of the carbon black i.e. the time required for the transfer from the raw material introduction point to the reaction termination position (in FIG. 1, the time required for the transfer in the length D for introduction of carbon black raw material and the length E for stopping of the reaction) is made to be from 40 msec to 500 msec, preferably from 50 msec to 200 msec. Further, in a case where the temperature in the furnace is as low as lower than 1,500° C., the retention time in the furnace may be made over 500 msec and at most 5 seconds, preferably from 1 to 3 seconds.

With the carbon black of the present invention, the dehydrogenation amount is particularly small, and it is preferred to employ a method wherein the temperature of the high temperature combustion gas stream in the furnace is made to be high at a level of at least 1,700° C., or on the downstream side of the carbon black raw material supply nozzle, oxygen is further introduced into the furnace to burn hydrogen, etc. on the carbon black surface, so that by this reaction heat, the retention time at the high temperature is prolonged. It is preferred that by such a method, crystallization in the vicinity of the surface of carbon black and dehydrogenation at the interior of the carbon black can be carried out effectively.

The carbon black of the present invention is incorporated to a resin to obtain a conductive resin composition. As the resin, an optional one may be used. Specifically, an α-olefin resin such as low density polyethylene, medium density polyethylene, high density polyethylene, linear low density polyethylene, polypropylene, polybutene-1, a propylene/ethylene block or random copolymer, an ethylene/vinyl acetate copolymer, an ethylene/acrylic acid copolymer, an ethylene/methacrylic acid copolymer, maleic anhydride-modified polypropylene, maleic anhydride-modified polyethylene, an α-olefin polymer modified by addition of a vinyl monomer such as styrene or vinyl acetate; a polyamide resin such as nylon 6 or nylon 66; a polyester resin such as polyethylene terephthalate or polybutylene terephthalate; a polyether resin such as polyacetal or polyphenylene oxide; a polycarbonate resin; a styrene resin such as polystyrene, an acrylonitrile/butadiene/styrene ternary copolymer (ABS) or high impact polystyrene; a halogenated resin such as polyvinyl chloride, polyvinylidene fluoride or polytetrafluoroethylene; an acrylic resin such as polymethyl methacrylate or polyacrilonitrile; a polysulfone resin; a thermoplastic resin such as a polyphenylene sulfide resin; and a thermosetting resin such as phenol, melamine or epoxy, may be mentioned. Further, rubber may further be mixed to such a resin for the purpose of taking a balance of the physical properties of the resin composition.

Among these resins, an olefin resin, a polyacetal resin, a polyamide resin, a polyester resin, a polyphenylene oxide resin or a styrene resin, is for example preferred. Particularly preferred is an ethylene resin, a polypropylene resin, a propylene/ethylene block or a random copolymer resin, a polyamide resin or a styrene resin. The amount of carbon black in the resin composition is suitably selected depending upon the particular application. For example, in an application for prevention of static charge, it is usually within a range of from 1 to 30 wt %, preferably from 2 to 15 wt %.

EXAMPLES

Now, the present invention will be described in further detail with reference to Examples and Comparative Examples. However, it should be understood that the present invention by no means restricted to the following Examples. In the following Examples, etc., the method for preparation of a resin composition and the test method are as follows. As resin types, polyethylene and high impact polystyrene were employed.

Blend of Polyethylene Resin Composition

The blend of a polyethylene resin composition containing carbon black is as follows. Further, the blend amount of carbon black is as shown in Tables 3 and 4.

Thermal stabilizer: Irganox 1010 (manufactured by Nihon Ciba-Geigy K.K.) 0.5 wt %

Lubricant: calcium stearate (manufactured by Sakai Kagaku Kogyo K.K.) 0.8 wt %

Resin: polyethylene (LF440HA, manufactured by Mitsubishi Chemical Corporation) Rest Evaluation of Electric Conductivity of Polyethylene Resin Composition Using a mixer having a Banbury mixer B250 attached to a Laboplastomill C model (manufactured by Toyo Seiki Seisakusho Co., Ltd.), only the resin was firstly preliminarily kneaded for two minutes under conditions of a kneading temperature of 115° C. and a rotational speed of 70 rpm, and then, carbon black and other additives were introduced, followed by kneading for 7 minutes to obtain a resin composition. This resin composition was formed into a sheet having a thickness of about 1 mm by a 6 inch mixing roll machine 191-TM model (manufactured by Yasuda Seiki Seisakusho, LTD.). Then, the sheet was cut and pressed (pressing temperature: 150° C., pressing pressure: 100 kg/cm$^2$, pressing time: 2 minutes) by a heating/cooling type test press machine (manufactured by Nisshin Kagaku K.K.) to obtain a flat plate for evaluation test of 10 cm×10 cm×0.2 cm. Then, a center portion of this flat plate was cut out with a width of 2 cm, and the volume resistivity (VR) was measured in accordance with the SRIS method (method by Society of Rubber Industry, Japan). For the measurement of the resistivity, Digital Multimeter TR6847 (manufactured by Advantest) was used. With respect to one having a resistance of at least 200 MΩ (corresponding to a VR of about $1.3 \times 10^7$ Ω·cm), High Resistance Meter 4329A (manufactured by YHP) was used for the measurement. Judgment was made on such a basis that the smaller the VR, the better the electrical conductivity.

Evaluation of Flowability of Polyethylene Resin Composition

In accordance with JIS K7210, the melt flow rate (MFR) of the resin composition was measured at a temperature of 190° C. under a load of 10 kgf.

Blend of High Impact Polystyrene Resin Composition

The blend of a high impact polystyrene resin composition containing carbon black is as follows. Further, the blend amount of carbon black is as shown in Table 6.

Thermal stabilizer: Irganox 1010 (manufactured by Nihon Ciba-Geigy K.K.) 0.5 wt %

Lubricant: calcium stearate (manufactured by Sakai Kagaku Kogyo K.K.) 0.5 wt %

Resin: high impact polyethylene (H8601, manufactured by PS Japan K.K.) Rest

Evaluation of Electrical Conductivity of High Impact Polystyrene Resin Composition Using a mixer having a Banbury mixer B250 attached to a Laboplastomill C model (manufactured by Toyo Seiki Seisakusho Co., Ltd., only the resin was firstly preliminarily kneaded for two minutes under conditions of a kneading temperature of 135° C. and a rotational speed of 50 rpm, and then, carbon black and other additives were introduced, followed by kneading for 8 minutes to obtain a resin composition. This resin composition was formed into a sheet having a thickness of about 1 mm by a 6 inch mixing roll machine 191-TM model (manufactured by Yasuda Seiki Seisakusho, LTD.). Then, this sheet was cut and pressed (pressing temperature: 160° C., pressing pressure: 100 kg/cm², pressing time: 2 minutes) by a heating/cooling type test press machine (manufactured by Nisshin Kagaku K.K.) to obtain a flat plate for evaluation test of 10 cm×10 cm×0.2 cm. For the evaluation of the electrical conductivity, the volume resistivity (VR) was measured in accordance with the SRIS method (method by Society of Rubber Industry, Japan) in the same manner as for the polyethylene resin composition.

Evaluation of Flowability of High Impact Polystyrene Resin Composition

In accordance with JIS K7210, the melt flow rate (MFR) of the resin composition was measured at a temperature of 200° C. under a load of 10 kgf.

Examples 1 to 4 and Comparative Examples 1, 2, 4 and 5 Preparation Of Carbon Black Using the apparatus for producing carbon black as shown in FIG. 1, carbon black was prepared under the production conditions and the in-furnace apparatus conditions such as the length D for introduction of raw material oil and the length E for stopping the reaction, as shown in Table 1.

Further, with respect to the in-furnace sizes D1 to D3 and L1 in FIG. 1, one of the following three types was employed.

Type A: D1=1,100 mmΦ, D2=175 mmΦ, D3=400 mmΦ, L1=3,300 mmΦ, D2'=190 mmΦ

Type B: D1=500 mmΦ, D2=55 mmΦ, D3=200 mmΦ, L1=3,200 mmΦ(D2'=D2)

Type C: D1=1,100 mmΦ, D2=175 mmΦ, D3=400 mmΦ, L1=2,750 mmΦ(D2'=D2)

Further, as the fuel for the high temperature combustion gas stream, heavy oil was used in Examples 1 to 4 and Comparative Examples 4 and 5, and LNG was used in Examples 1 and 2. Further, in Examples and Comparative Examples, the carbon black raw material (raw material oil) is creosote oil, and the in-furnace temperature in the second reaction zone was set to be 1,750° C. The physical properties of the obtained carbon black are shown in Table 1.

Comparative Example 3

The carbon black obtained in Example 1 was put and filled in a graphite crucible having a capacity of 70 L and set in an Acheson furnace. The entire crucible was covered with a packed powder of carbon black, and an electric current was conducted.

The temperature was raised at a temperature raising speed of 35° C./min to 2,000° C., then maintained at 2,000° C. for one hour and then left to cool. After the temperature became room temperature, the carbon black was taken out. The properties of the obtained carbon black are shown in Table 1.

Comparative Examples 6 to 11

The properties of commercially available conductive carbon blacks used for comparison are shown in Table 2.

Figure 3:
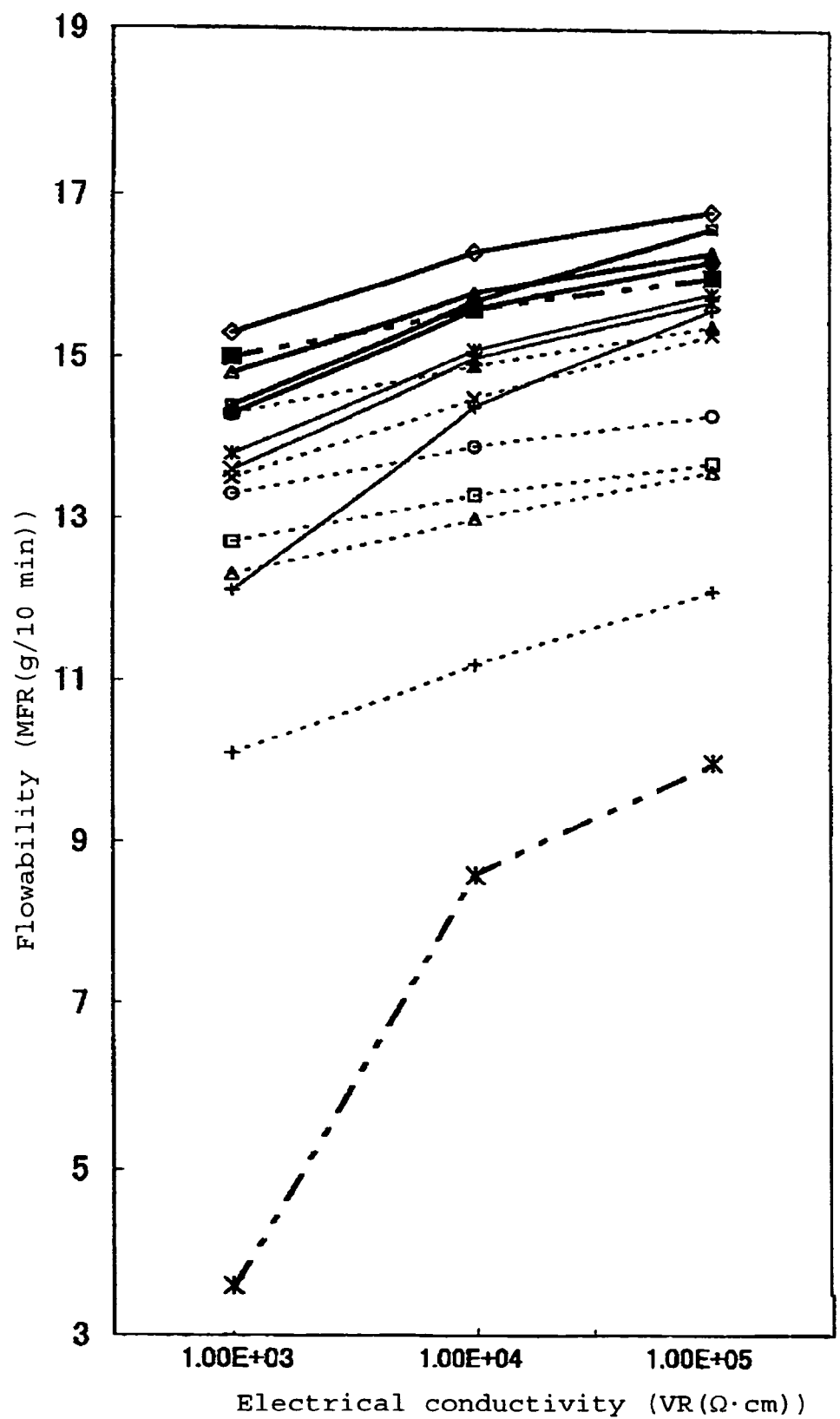
FIG. 3 is a graph showing the results of Examples and Comparative Examples for polyethylene resin compositions.

The results of evaluation of the properties (electrical conductivity and flowability) of the polyethylene resin compositions employing the above carbon blacks, are shown in Tables 3 and 4. Further, with respect to the polyethylene resin compositions employing the above carbon blacks, the flowability (MFR(g/10 min)) when the electrical conductivity (VR (Ω·cm)) was adjusted to be the same, was obtained by using the results in Tables 3 and 4 by interpolation (extrapolation in the case shown by brackets). The results are shown in Table 5 and FIG. 3.

Further, the results of evaluation of properties (electrical conductivity and flowability) of the high impact polystyrene resin compositions employing the carbon blacks in Example 3 and 4 and Comparative Examples 6, 8 and 11, are shown in Table 6. Further, with respect to the high impact polystyrene resin compositions using the above carbon blacks, the flowability (MFR(g/10 min)) when the electrical conductivity (VR(Ω·cm)) was adjusted to be the same, was obtained by using the results in Table 6 by interpolation. The results are shown in Table 7 and FIG. 4.

TABLE 1

| | | | Ex. 1 | Ex. 2 | Ex. 3 | Ex. 4 |
|---|---|---|---|---|---|---|
| Production conditions | In-furnace size type | — | Type A | Type A | Type A | Type A |
| | Amount of combustion air | Nm³/h | 5,800 | 5,800 | 5,500 | 5,300 |
| | Temperature of combustion air | ° C. | 640 | 640 | 640 | 640 |
| | Type of fuel | — | C heavy oil | C heavy oil | C heavy oil | C heavy oil |
| | Amount of fuel | kg/h | 314 | 314 | 297 | 286 |
| | Amount of raw material oil | kg/h | 1,040 | 1,220 | 1,330 | 1,000 |
| | Length for introduction of raw material oil | mm | 1,650 | 1,650 | 1,650 | 2,300 |
| | Length for stopping the reaction | mm | 4,430 | 4,430 | 4,430 | 4,430 |
| | Amount of water for terminating the reaction | kg/h | 3,000 | 3,000 | 2,600 | 2,600 |
| | Retention time from introduction of raw material to termination | msec. | 57 | 57 | 60 | 81 |

TABLE 1-continued of reaction

|  |  |  | Comp. Ex. 1 | Comp. Ex. 2 | Comp. Ex. 3 | Comp. Ex. 4 | Comp. Ex. 5 |
|---|---|---|---|---|---|---|---|
| Production conditions | In-furnace size type | — | Type B | Type B |  |  |  |
|  | Amount of combustion air | $Nm^3/h$ | 500 | 500 |  | 4,000 | 5,800 |
|  | Temp. of combustion air | °C. | 30 | 30 |  | 574 | 640 |
|  | Type of fuel | — | Natural gas | Natural gas |  | D heavy oil | C heavy oil |
|  | Amount of fuel | kg/h | 43 $Nm^3/h$ | 43 $Nm^3/h$ |  | 253 | 314 |
|  | Amount of raw material oil | kg/h | 90 | 81 |  | 700 | 850 |
|  | Length for introduction of raw material oil | mm | 1,200 | 1,200 |  | 1,750 | 2,390 |
|  | Length for stopping the reaction | mm | 910 | 910 |  | 2,150 | 1,600 |
|  | Amount of water for terminating the reaction | kg/h | 150 | 150 |  | 1,000 | 1,800 |
|  | Retention time from introduction of raw material to termination of reaction | msec. | 21 | 21 |  | 28 | 32 |

|  |  |  | Ex. 1 | Ex. 2 | Ex. 3 | Ex. 4 |
|---|---|---|---|---|---|---|
| Physical properties | Average particle diameter | nm | 15 | 18 | 21 | 16 |
|  | Nitrogen adsorption specific surface area | $m^2/g$ | 288 | 204 | 169 | 278 |
|  | DBP absorption | $cm^3/100\ g$ | 159 | 167 | 173 | 204 |
|  | 24M4DBP absorption | $cm^3/100\ g$ | 135 | 131 | 134 | 147 |
|  | CTAB adsorption specific surface area | $m^2/g$ | 195 | 153 | 128 | 182 |
|  | Dehydrogenation amount | mg/g | 0.77 | 0.93 | 1.05 | 0.83 |
|  | Crystallite size Lc | Å | 14.0 | 14.0 | 13.8 | 15.3 |
|  | Stokes mode diameter ($D_{mod}$) | nm | 84 | 93 | 98 | 125 |
|  | Stokes mode half value width ($D_{1/2}$) | nm | 69 | 69 | 65 | 129 |
|  | $D_{mod}$/24M4DBP | — | 0.62 | 0.69 | 0.73 | 0.84 |
|  | $D_{1/2}$/24M4DBP | — | 0.51 | 0.51 | 0.48 | 0.87 |
|  | CO generation | mg/g | 13.9 | 15.7 | 9.7 | 11.8 |
|  | $CO_2$ generation | mg/g | 4.28 | 2.49 | 1.40 | 1.35 |
|  | Oxygen-containing functional group density | $\mu mol/m^2$ | 2.06 | 2.58 | 2.23 | 1.62 |

|  |  |  | Comp. Ex. 1 | Comp. Ex. 2 | Comp. Ex. 3 | Comp. Ex. 4 | Comp. Ex. 5 |
|---|---|---|---|---|---|---|---|
| Physical properties | Average particle diameter | nm | 18 | 15 | 15 | 22 | 15 |
|  | Nitrogen adsorption specific surface area | $m^2/g$ | 240 | 320 | 156 | 206 | 266 |
|  | DBP absorption | $cm^3/100\ g$ | 177 | 171 | 155 | 155 | 200 |
|  | 24M4DBP absorption | $cm^3/100\ g$ | 132 | 134 | 131 | 134 | 132 |
|  | CTAB adsorption specific surface area | $m^2/g$ | 154 | 194 | 145 | 161 | 230 |
|  | Dehydrogenation amount | $m^2/g$ | 2.00 | 2.32 | 0.09 | 1.25 | 1.23 |
|  | Crystallite size Lc | Å | 13.1 | 12.5 | 28.9 | 13.5 | 13.1 |
|  | Stokes mode diameter ($D_{mod}$) | nm | 81 | 71 | 91 | 92 | 127 |
|  | Stokes mode half value width ($D_{1/2}$) | nm | 55 | 48 | 92 | 64 | 145 |
|  | $D_{mod}$/24M4DBP | — | 0.62 | 0.55 | 0.69 | 0.69 | 0.96 |
|  | $D_{1/2}$/24M4DBP | — | 0.42 | 0.38 | 0.70 | 0.48 | 1.10 |
|  | CO generation | mg/g | 24.4 | 24.7 | 2.34 | 14.7 | 7.3 |
|  | $CO_2$ generation | mg/g | 6.79 | 6.09 | 0.26 | 13.2 | 3.48 |
|  | Oxygen-containing functional group density | $\mu mol/m^2$ | 5.03 | 3.16 | 0.57 | 4.01 | 1.28 |

TABLE 2

| | | | Comp. Ex. 6 | Comp. Ex. 7 | Comp. Ex. 8 |
|---|---|---|---|---|---|
| | Brand | | Vulcan XC-72 | Conductex 975U | Toka Black #5500 |
| | Manufacturers | | Cabot | Columbian Chemical Co. | Tokai Carbon Co., Ltd. |
| Physical properties | Average particle diameter | nm | 29 | 26 | 28 |
| | Nitrogen adsorption specific surface area | $m^2/g$ | 256 | 252 | 253 |
| | DBP absorption | $cm^3/100\ g$ | 166 | 163 | 160 |
| | 24M4DBP absorption | $cm^3/100\ g$ | 119 | 133 | 127 |
| | CTAB adsorption specific surface area | $m^2/g$ | 141 | 132 | 148 |
| | Dehydrogenation amount | $m^2/g$ | 1.44 | 1.23 | 1.5 |
| | Crystallite size Lc | Å | 15.8 | 16.3 | 14.9 |
| | Stokes mode diameter ($D_{mod}$) | nm | 187 | 166 | 119 |
| | Stokes mode half value width ($D_{1/2}$) | nm | 163 | 129 | 86 |
| | $D_{mod}$/24M4DBP | — | 1.57 | 1.25 | 0.94 |
| | $D_{1/2}$/24M4DBP | — | 1.37 | 0.97 | 0.68 |
| | CO generation | mg/g | 21.7 | 16.5 | 11.7 |
| | $CO_2$ generation | mg/g | 4.12 | 2.22 | 3.84 |
| | Oxygen-containing functional group density | $\mu mol/m^2$ | 3.39 | 2.53 | 1.99 |

| | | | Comp. Ex. 9 | Comp. Ex. 10 | Comp. Ex. 11 |
|---|---|---|---|---|---|
| | Brand | | Toka Black #4500 | Denka black granular | Ketjen EC |
| | Manufacturers | | Tokai Carbon Co., Ltd. | Denki Kagaku Kogyo | Ketjen Black International |
| Physical properties | Average particle diameter | nm | 42 | 36 | 30 |
| | Nitrogen adsorption specific surface area | $m^2/g$ | 53 | 72 | 800 |
| | DBP absorption | $cm^3/100\ g$ | 162 | 164 | 360 |
| | 24M4DBP absorption | $cm^3/100\ g$ | 94 | 125 | 320 |
| | CTAB adsorption specific surface area | $m^2/g$ | 55 | 70 | — |
| | Dehydrogenation amount | $m^2/g$ | 2.04 | 0.32 | 2.95 |
| | Crystallite size Lc | Å | 15.6 | 35 | — |
| | Stokes made diameter ($D_{mod}$) | nm | 158 | 146 | 103 |
| | Stokes mode half value width ($D_{1/2}$) | nm | 98 | 192 | 114 |
| | $D_{mod}$/24M4DBP | — | 1.68 | 1.17 | 0.32 |
| | $D_{1/2}$/24M4DBP | — | 1.04 | 1.54 | 0.36 |
| | CO generation | mg/g | 8.4 | 6.9 | 11.9 |
| | $CO_2$ generation | mg/g | 2.83 | 0 | 0.78 |
| | Oxygen-containing functional group density | $\mu mol/m^2$ | 6.87 | 3.44 | 0.55 |

TABLE 3

| Polyethylene resin composition No. | Carbon black Used (CB) Type of CB | Amount (wt %) | MFR (g/10 min) | VR ($\Omega \cdot cm$) |
|---|---|---|---|---|
| 1-1 | CB in Ex. 1 | 8 | 18.1 | 4.42E+10 |
| 1-2 | | 10 | 15.6 | 1.00E+04 |
| 1-3 | | 12.5 | 12.5 | 2.99E+02 |
| 1-4 | | 15 | 9.5 | 6.71E+01 |
| 2-1 | CB in Ex. 2 | 8 | 18.1 | 6.01E+11 |
| 2-2 | | 10 | 16.5 | 2.26E+04 |
| 2-3 | | 12.5 | 14.7 | 4.99E+02 |
| 2-4 | | 15 | 12.5 | 8.30E+01 |
| 3-1 | CB in Ex. 3 | 8 | 18.4 | 1.75E+12 |
| 3-2 | | 10 | 16.2 | 5.45E+04 |
| 3-3 | | 12.5 | 14.8 | 9.31E+02 |
| 3-4 | | 15 | 12.5 | 1.88E+02 |
| 4-1 | CB in Ex. 4 | 6.5 | 18.6 | 6.46E+09 |
| 4-2 | | 7.5 | 16.7 | 1.35E+05 |
| 4-3 | | 10 | 13.4 | 2.64E+02 |
| 4-4 | | 12.5 | 9.6 | 5.79E+01 |
| Co1-1 | CB in Comp. Ex. 1 | 9 | 17.5 | 6.68E+10 |
| Co1-2 | | 10 | 16.5 | 3.19E+06 |
| Co1-3 | | 12.5 | 14.1 | 1.40E+03 |
| Co1-4 | | 15 | 11.6 | 4.08E+02 |
| Co2-1 | CB in Comp. Ex. 2 | 9 | 17.6 | 6.97E+11 |
| Co2-2 | | 10 | 16.7 | 4.48E+07 |
| Co2-3 | | 12.5 | 14.5 | 3.22E+03 |
| Co2-4 | | 15 | 12.3 | 4.39E+02 |
| Co3-1 | CB in Comp. Ex. 3 | 10 | 18.6 | 5.89E+11 |
| Co3-2 | | 12.5 | 15.5 | 8.81E+04 |
| Co3-3 | | 15 | 12.7 | 1.69E+03 |
| Co3-4 | | 17.5 | 9.4 | 2.06E+02 |
| Co4-1 | CB in Comp. Ex. 4 | 10 | 15.8 | 1.42E+09 |
| Co4-2 | | 12.5 | 13.7 | 3.55E+03 |
| Co4-3 | | 15 | 11.9 | 2.18E+02 |
| Co4-4 | | 17.5 | 10.1 | 6.27E+01 |
| Co5-1 | CB in Comp. Ex. 5 | 8 | 17.5 | 8.64E+09 |

TABLE 3-continued

| Polyethylene resin composition No. | Carbon black Used (CB) Type of CB | Amount (wt %) | MFR (g/10 min) | VR (Ω · cm) |
|---|---|---|---|---|
| Co5-2 | | 10 | 15.7 | 4.65E+05 |
| Co5-3 | | 12.5 | 13.6 | 1.28E+03 |
| Co5-4 | | 15 | 11.7 | 9.93E+01 |

TABLE 4

| Polyethylene resin composition No. | Carbon black Used (CB) Type of CB | Amount (wt %) | MFR (g/10 min) | VR (Ω · cm) |
|---|---|---|---|---|
| Co6-1 | CB in Comp. Ex. 6 | 8 | 16.6 | 6.50E+10 |
| Co6-2 | | 10 | 14.4 | 2.80E+06 |
| Co6-3 | | 12.5 | 11.8 | 2.95E+02 |
| Co6-4 | | 15 | 9 | 6.65E+01 |
| Co7-1 | CB in Comp. Ex. 7 | 10 | 15.6 | 4.12E+10 |
| Co7-2 | | 12.5 | 12.8 | 1.48E+03 |
| Co7-3 | | 15 | 9.4 | 7.73E+01 |
| Co7-4 | | 17.5 | 6.4 | 3.46E+01 |
| Co8-1 | CB in Comp. Ex. 8 | 8 | 17.5 | 9.60E+09 |
| Co8-2 | | 10 | 16.2 | 6.48E+06 |
| Co8-3 | | 12.5 | 14.1 | 6.32E+02 |
| Co8-4 | | 15 | 10.7 | 7.10E+01 |
| Co9-1 | CB in Comp. Ex. 9 | 10 | 14.7 | 4.63E+10 |
| Co9-2 | | 12.5 | 12.6 | 5.51E+05 |
| Co9-3 | | 15 | 9.7 | 4.24E+02 |
| Co9-4 | | 17.5 | 7.7 | 4.73E+01 |
| Co10-1 | CB in Comp. Ex. 10 | 10 | 12.8 | 5.08E+10 |
| Co10-2 | | 12.5 | 9.9 | 7.35E+04 |
| Co10-3 | | 15 | 7.1 | 5.30E+03 |
| Co10-4 | | 17.5 | 4.1 | 1.50E+03 |
| Co11-1 | CB in Comp. Ex. 11 | 3.5 | 17.8 | 1.96E+09 |
| Co11-2 | | 5 | 14.9 | 8.00E+02 |
| Co11-3 | | 6.5 | 12.2 | 1.08E+02 |
| Co11-4 | | 8 | 9.2 | 3.39E+01 |

TABLE 5

| Polyethylene resin composition | MFR1 | MFR2 | MFR3 |
|---|---|---|---|
| Resin Composition employing CB in Ex. 1 (Resin Composition No. 1) | 14.3 | 15.6 | 16.2 |
| Resin Composition employing CB in Ex. 2 (Resin Composition No. 2) | 15.3 | 16.3 | 16.8 |
| Resin Composition employing CB in Ex. 3 (Resin Composition No. 3) | 14.8 | 15.8 | 16.3 |
| Resin Composition employing CB in Ex. 4 (Resin Composition No. 4) | 14.4 | 15.7 | 16.6 |
| Resin Composition employing CB in Comp. Ex. 1 (Resin Composition No. Co1) | 13.8 | 15.1 | 15.8 |
| Resin Composition employing CB in Comp. Ex. 2 (Resin Composition No. Co2) | 13.6 | 15.0 | 15.7 |
| Resin Composition employing CB in Comp. Ex. 3 (Resin Composition No. Co3) | 12.1 | 14.4 | 15.6 |
| Resin Composition employing CB in Comp. Ex. 4 (Resin Composition No. Co4) | 13.3 | 13.9 | 14.3 |
| Resin Composition employing CB in Comp. Ex. 5 (Resin Composition No. Co5) | 13.5 | 14.5 | 15.3 |
| Resin Composition employing CB in Comp. Ex. 6 (Resin Composition No. Co6) | 12.3 | 13.0 | 13.6 |
| Resin Composition employing CB in Comp. Ex. 7 (Resin Composition No. Co7) | 12.7 | 13.3 | 13.7 |
| Resin Composition employing CB in Comp. Ex. 8 (Resin Composition No. Co8) | 14.3 | 14.9 | 15.4 |
| Resin Composition employing CB in Comp. Ex. 9 (Resin Composition No. Co9) | 10.1 | 11.2 | 12.1 |
| Resin Composition employing CB in Comp. Ex. 10 (Resin Composition No. Co10) | (3.6) | 8.6 | 10 |
| Resin Composition employing CB in Comp. Ex. 11 (Resin Composition No. Co11) | 15 | 15.6 | 16 |

MFR1: MRF (g/10 min) when the electrical conductivity of the resin composition is 1.00E+0.3 (Ω · cm)
MFR2: MRF (g/10 min) when the electrical conductivity of the resin composition is 1.00E+0.4 (Ω · cm)
MFR3: MRF (g/10 min) when the electrical conductivity of the resin composition is 1.00E+0.5 (Ω · cm)

TABLE 6

| High impact polystyrene resin composition No. | Carbon black Used (CB) Type of CB | Amount (wt %) | MFR (g/10 min) | VR (Ω · cm) |
|---|---|---|---|---|
| 5-1 | CB in Ex. 3 | 12.5 | 22.1 | 6.40E+07 |
| 5-2 | | 15 | 15.4 | 3.58E+04 |
| 5-3 | | 17.5 | 10.8 | 1.07E+03 |
| 5-4 | | 20 | 7.3 | 2.93E+02 |
| 6-1 | CB in Ex. 4 | 10 | 24.4 | 3.04E+09 |
| 6-2 | | 12.5 | 17.4 | 4.58E+05 |
| 6-3 | | 15 | 11.5 | 2.14E+03 |
| 6-4 | | 17.5 | 6.9 | 3.91E+02 |
| Co12-1 | CB in Comp. Ex. 6 | 12.5 | 23.9 | 6.04E+09 |
| Co12-2 | | 15 | 16.9 | 5.57E+05 |
| Co12-3 | | 17.5 | 11.9 | 3.87E+03 |
| Co12-4 | | 20 | 8.2 | 4.46E+02 |
| Co13-1 | CB in Comp. Ex. 8 | 12.5 | 23.1 | 4.42E+09 |
| Co13-2 | | 15 | 16.6 | 1.26E+06 |
| Co13-3 | | 20 | 8.2 | 6.11E+03 |
| Co13-4 | | 25 | 2.8 | 1.36E+02 |
| Co14-1 | CB in Comp. Ex. 11 | 8 | 16.5 | 4.85E+08 |
| Co14-2 | | 10 | 11.5 | 9.66E+05 |
| Co14-3 | | 12 | 6.4 | 2.39E+03 |
| Co14-4 | | 14 | 3.3 | 4.73E+02 |

TABLE 7

| High impact polyethylene resin composition | MFR1 | MFR2 | MFR3 |
|---|---|---|---|
| Resin Composition employing CB in Ex. 3 (Resin Composition No. 5) | 10.7 | 14.0 | 16.4 |
| Resin Composition employing CB in Ex. 4 (Resin Composition No. 6) | 10.0 | 13.5 | 16.0 |
| Resin Composition employing CB in Comp. Ex. 6 (Resin Composition No. Co12) | 9.8 | 13.0 | 15.4 |
| Resin Composition employing CB in Comp. Ex. 8 (Resin Composition No. Co13) | 5.6 | 9.0 | 13.0 |
| Resin Composition employing CB in Comp. Ex. 11 (Resin Composition No. Co14) | 5.2 | 7.7 | 9.7 |

MFR1: MRF (g/10 min) when the electrical conductivity of the resin composition is 1.00E+0.3 ($\Omega \cdot cm$)
MFR2: MRF (g/10 min) when the electrical conductivity of the resin composition is 1.00E+0.4 ($\Omega \cdot cm$)
MFR3: MRF (g/10 min) when the electrical conductivity of the resin composition is 1.00E+0.5 ($\Omega \cdot cm$)

As is evident from Table 1, the carbon blacks of the present invention obtained in Examples 1 to 4 have characteristics such that the 24M4DBP absorption is at least 130 cm$^3$/100 g, the dehydrogenation amount is at least 1.2 mg/g and the crystallite size Lc is from 10 to 17 Å. And, as shown in Tables 3 and 4, when the polyethylene resin compositions employing the carbon blacks of the present invention (resin composition No. 1-1 to 4-4) and the polyethylene resin compositions employing the carbon blacks in Comparative Examples (resin composition No. Co1-1 to Co10-4) are compared, it is evident that as compared with resin composition No. Co1-1 to Co10-4, the resin composition No. 1-1 to 4-4 are excellent in electrical conductivity, and have sufficiently high flowability, and thus they are resin compositions excellent in both properties of the electrical conductivity and flowability and having a good balance.

Further, as shown in Table 5, when the polyethylene resin compositions using the carbon blacks of the present invention (resin composition No. 1-1 to 4-4) and the polyethylene resin compositions using the carbon blacks in Comparative Examples (resin composition No. Co1-1 to Co10-4) are compared, it is evident that the resin compositions using the carbon blacks of the present invention have high MFR values when the electrical conductivity is adjusted to be the same, and thus they are excellent in the flowability. As is evident from FIG. 3 wherein such results are graphically presented, the resin compositions using the carbon blacks of the present invention are excellent in both the electrical conductivity and the flowability, as compared with the resin compositions using the carbon blacks in Comparative Examples.

Further, the carbon black in Comparative Example 11 is Ketjen EC having a unique structure of a hollow shell having a high specific surface area and high DBP and is known as highly conductive carbon black. As is evident from Tables 3, 4 and 5 and FIG. 3, the polyethylene resin compositions using the carbon blacks in Examples 1 to 4 of the present invention show electrical conductivity and flowability equal to or better than the polyethylene resin composition employing the carbon black of this Comparative Example 11.

Further, as shown in Table 6, when the high impact polystyrene resin compositions using the carbon blacks of the present invention (resin composition No. 5-1 to 6-4) and the high impact polystyrene resin compositions using the carbon blacks in Comparative Examples (resin composition No. Co12-1 to Co14-4) are compared, it is evident that the resin composition No. 5-1 to 6-4 are excellent in the electrical conductivity and have adequately high flowability, as compared with the resin composition No. Co12-1 to Co14-4, and they are resin compositions excellent in both properties of the electrical conductivity and the flowability and having a good balance.

Further, as shown in Table 7, when the high impact polystyrene resin compositions using the carbon blacks of the present invention (resin composition No. 5-1 to 6-4) and the high impact polystyrene resin compositions using the carbon blacks in Comparative Examples (resin composition No. Co12-1 to Co14-4) are compared, it is evident that the resin compositions using the carbon blacks of the present invention have high MFR values when the electrical conductivity is adjusted to be the same and thus are excellent in the flowability. As is evident from FIG. 4 wherein such results are graphically presented, the resin compositions using the carbon blacks of the present invention are excellent in both the electrical conductivity and the flowability, as compared with the resin compositions using the carbon blacks in Comparative Examples. Especially, with the carbon black in Comparative Example 11 which was relatively good in the polyethylene type, the balance of the electrical conductivity and the flowability was substantially poor in the high impact polystyrene type. Whereas, with those employing the carbon blacks of the present invention, the electrical conductivity and the flowability were good. Such stability of the electrical conductivity and the flowability is attributable to the fact that the carbon blacks of the present invention have characteristics such that the 24M4DBP absorption is at least 130 cm$^3$/100 g, the dehydrogenation amount is at most 1.2 mg/g, and the crystallite size Lc is from 10 to 17 Å.

The entire disclosures of Japanese Patent Application No. 2003-286905 filed on Aug. 5, 2003 and Japanese Patent Application No. 2004-206165 filed on Jul. 13, 2004 including specifications, claims, drawings and summaries are incorporated herein by reference in their entireties.

What is claimed is:

1. Carbon black, which has:
  (a) a 24M4DBP absorption of at least 131 cm$^3$/100 g;
  (b) a (1,500° C.×30 min) dehydrogenation amount of at most 1.2 mg/g;
  (c) a crystallite size Lc of from 10 to 17 Å;
  (d) a nitrogen adsorption specific surface area of from 150 to 300 m$^2$/g;
  (e) a ratio of the Stokes mode diameter, $D_{mod}$, in nm, to the 24M4DBP absorption, in cm$^3$/100 g, of from 0.6 to 0.9 nm·100 g/cm$^3$; and
  (f) an average particle diameter as measured by a transmission electron microscope of from 14 to 24 nm.

2. The carbon black according to claim 1, which has a CTAB (cetyltrimethylammonium bromide) adsorption specific surface area of from 120 to 220 m$^2$/g.

3. The carbon black according to claim 1, which has a DBP absorption of from 150 to 400 cm$^3$/100 g.

4. The carbon black according to claim 1, which has an oxygen-containing functional group density of at most 3 μmol/m$^2$, wherein said oxygen-containing functional group density is defined by the following formula:

$$\text{Oxygen-containing functional group density (μmol/m}^2\text{)} = [(1,500° C.×30 \text{ min}) \text{ CO generation (μmol/g)} + (1,500° C.×30 \text{ min}) \text{ CO}_2 \text{ generation (μmol/g)}]/\text{nitrogen adsorption specific surface area (m}^2\text{/g)}.$$

5. The carbon black according to claim 1, which is oil furnace carbon black.

6. The carbon black according to claim 1, which has a 24M4DBP absorption of at least 130 cm$^3$/100 g.

7. The carbon black according to claim 1, which has a 24M4DBP absorption of at least 140 cm$^3$/100 g.

8. The carbon black according to claim 1, which has a nitrogen adsorption specific surface area of from 200 to 290 m$^2$/g.

* * * * *